(12) United States Patent
Lin et al.

(10) Patent No.: US 6,278,812 B1
(45) Date of Patent: Aug. 21, 2001

(54) PROTECTION SCHEMES FOR MIRROR-FAILURE IN FREE-SPACE MICROMACHINED OPTICAL SWITCHES

(75) Inventors: Lih Y. Lin, Little Silver; Adel A. M. Saleh, Holmdel; Jane M. Simmons, Middletown, all of NJ (US)

(73) Assignee: AT&T Corporation, Middletown, NJ (US)

( * ) Notice: Subject to any disclaimer, the term of this patent is extended or adjusted under 35 U.S.C. 154(b) by 0 days.

(21) Appl. No.: 09/460,460

(22) Filed: Dec. 14, 1999

Related U.S. Application Data
(60) Provisional application No. 60/112,111, filed on Dec. 14, 1998.

(51) Int. Cl.[7] ................................................. G02B 6/26
(52) U.S. Cl. ............................... 385/18; 385/16; 385/17; 385/19; 385/24; 385/89
(58) Field of Search ................................. 385/16, 17, 18, 385/19, 20, 24, 89

(56) References Cited

U.S. PATENT DOCUMENTS

| | | | |
|---|---|---|---|
| 5,208,880 | * 5/1993 | Riza et al. | 385/18 |
| 5,960,132 | * 9/1999 | Lin | 385/18 |
| 6,002,818 | * 12/1999 | Fatchi et al. | 385/17 |
| 6,058,130 | * 5/2000 | Shinji et al. | 372/99 |

* cited by examiner

*Primary Examiner*—Hemang Sanghavi
*Assistant Examiner*—Jennifer Doan
(74) *Attorney, Agent, or Firm*—Kenyon & Kenyon

(57) ABSTRACT

The present invention provides a device and method for achieving protection in a free-space micromachined optical switching fabric. The present invention provides two protection schemes for mirror failures, which utilize either existing switching mirrors or additional integrated mirrors without extra fabrication effort or performance-degradation of the switch fabric. A switch fabric includes a plurality of micromachined free-rotating mirrors arranged in a rectilinear matrix configuration. The mirrors are reflective on both front and back sides. According to one embodiment of the present invention, upon the detection of a failed mirror associated with a transmission between an input and an output, a transmission path is determined that includes a backside of a pivot mirror. A transmission path is then established between the input and the output that utilizes the backside of the pivot mirror.

10 Claims, 6 Drawing Sheets

PROTECTION SCHEMES FOR MIRROR-FAILURE IN FREE-SPACE MICROMACHINED OPTICAL SWITCHES

PRIOR PROVISIONAL PATENT APPLICATION

The present application claims the benefit under 35 U.S.C. § 119(e) of U.S. Provisional Application No. 60/112,111 filed Dec. 14, 1998.

FIELD OF THE INVENTION

The present invention relates to optical networks. In particular, the present invention relates to a device and method for achieving protection in the case of mirror failure in free-space micromachined optical switches.

BACKGROUND INFORMATION

With the growing capacity demand for optical fiber communications, optical crossconnects ("OXCs") with hundreds of ports are expected to become essential components of future optical transport networks within three to five years. This requirement in port count far outstrips the demonstrated capabilities of current deployable technology. Conventional mechanical switches suffer from large size, large element mass and slow switching time. On the other hand, guided-wave solid-state switches show limited expandability due to their high loss, high crosstalk and long device length.

Recently, free-space micromachined optical switching technology has been proposed as a means of building large optical crossconnects. This technology features the advantages of free-space interconnection, chiefly low loss and low crosstalk, while retaining the compactness and batch-fabrication economy of monolithic integration. Furthermore, the sub-millisecond switching times are well matched to the needs of OXCs in optical transport networks.

With the increasing capacity demand and complexity of optical networks, restoring network traffic promptly in the event of fiber failure becomes an important issue for network control and management. Optical crossconnects have been proposed as promising candidates for provisioning and restoration in optical networks at wavelength levels. In addition to protecting fiber failures, the optical crossconnect should also have protection schemes for itself so that its functionality will not be interrupted when one or more of its switching elements malfunctions.

Recent developments have focused on free-space micromachined optical switches to achieve the optical performance and capacity requirement for optical crossconnects in multi-wavelength optical networks. The switch fabric includes micromachined free-rotating mirrors as switching elements. Backsides of the mirrors have also been used to achieve connection-symmetry in optical networks.

SUMMARY OF THE INVENTION

The present invention provides a device and method for achieving protection in a free-space micromachined optical switching fabric. The present invention provides two protection schemes for mirror failures, which utilize either existing switching mirrors or additional integrated mirrors without extra fabrication effort or performance-degradation of the switch fabric. A switch fabric includes a plurality of micromachined free-rotating mirrors arranged in a rectilinear matrix configuration. The mirrors are reflective on both front and back sides. According to one embodiment of the present invention, upon the detection of a failed mirror associated with a transmission between an input and an output, a transmission path is determined that includes a backside of a pivot mirror. A transmission path is then established between the input and the output that utilizes the backside of the pivot mirror.

According to one embodiment, the switching fabric utilizes M×N mirrors arranged in a rectilinear matrix configuration of M columns and N rows. Upon the detection of a mirror failure associated with a column Fc and a row Fr (mirror (Fc, Fr)), a pivot mirror is determined, wherein the pivot mirror is any actuated mirror having located in a column Pc and row Pr, wherein Pc<Fc and Pr<Fr. A first mirror at location (Fc,Pr) and a second mirror at location (Pc,Fr) are then actuated to perform the necessary routing.

According to an alternative embodiment, at least one protection row of switch mirrors and at least one protection column of switch mirrors is coupled to a rectilinear switch fabric. Upon detection of a mirror failure, a transmission path associated with the failed mirror is established by actuating mirrors in the protection row and protection column. In particular, according to one alternative embodiment, the present invention is applied to a rectilinear switch fabric of M×N micromirrors arranged in M columns and N rows. A series of input ports are provided along a first side of the switch fabric and a series of output ports are provided along a second side of the switch fabric perpendicular to the first side. According to the present invention, at least one protection row of mirrors is coupled between the input ports and the switch fabric and at least one protection column of mirrors is coupled between the output ports and the switch fabric, wherein the protection row includes a pivot mirror that is also co-located in the protection column. The pivot mirror is placed in a permanently actuated state. Upon detection of a mirror failure at location (Fc,Fr), a mirror in the protection row at location Fc is actuated and a mirror in the protection column at location Fr is actuated to form a transmission path from the input to the output via the pivot mirror.

DETAILED DESCRIPTION

Figure 1:
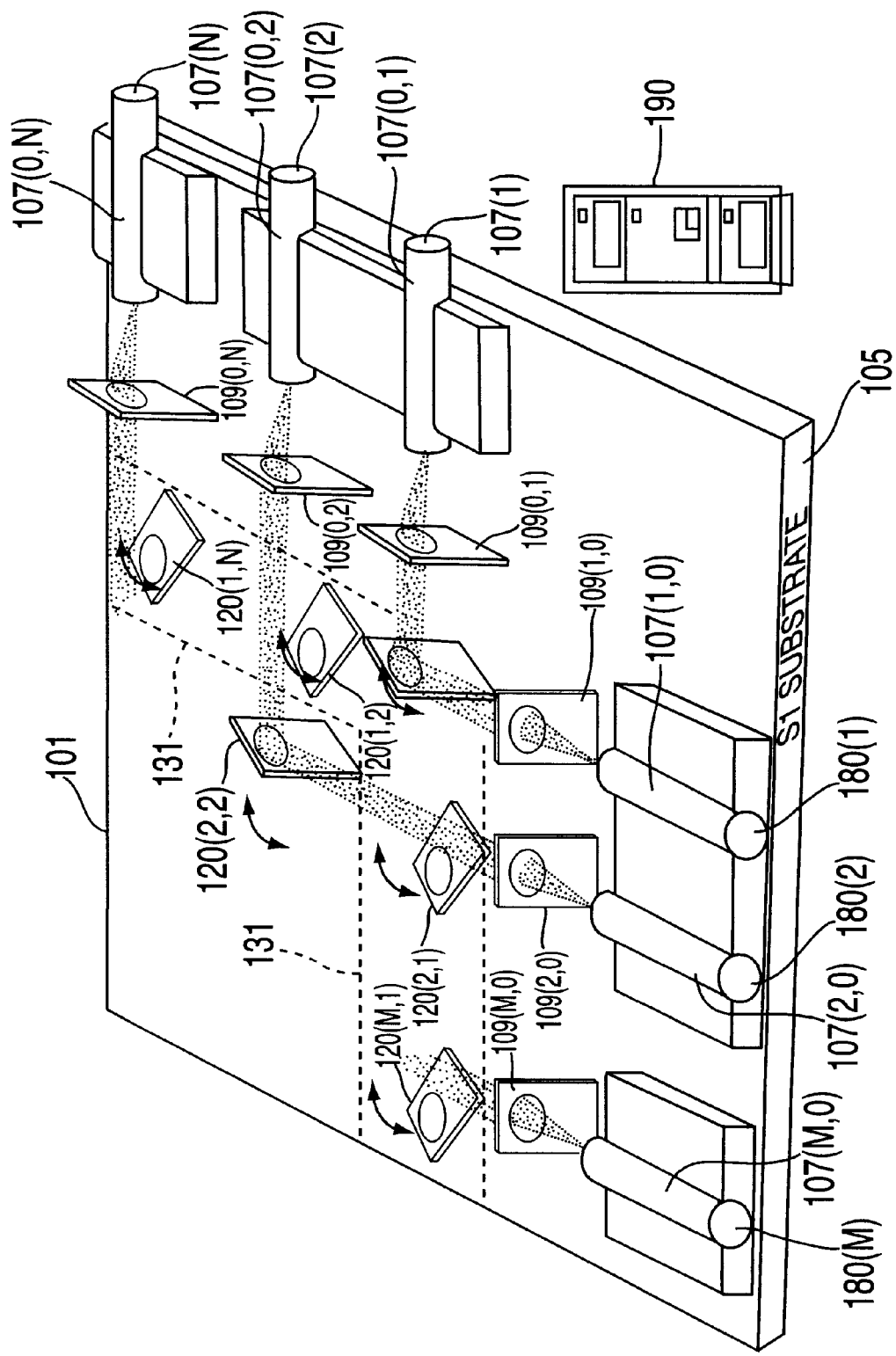
FIG. 1 depicts a micromachined optical switch according to one embodiment of the present invention.

FIG. 1 depicts a matrix free-space micromachined optical switch ("FS-MOS") according to one embodiment of the present invention. FS-MOS 101 includes silicon (Si) substrate 105, collimators 107(1,0)–107(M,0) arranged on a first perimeter of silicon substrate 105 and collimators 107(0,1)–107(0,N) arranged on a second perimeter of silicon substrate 105. Collimators 107(1,0)–107(M,0) each respectively receive an input signal from an input port 180(1)–180

(M) on FS-MOS 101. Likewise, collimators 107(0,1)–107(0,N) each respectively provide an output signal to an output port 170(1)–107(N) on FS-MOS 101. FS-MOS 101 further includes lenses 109(1,0)–109(M,0), each arranged, respectively between a collimator 107 and switch matrix 131. Likewise, FS-MOS 101 includes lenses 109(0,1)–109(0,N) arranged respectively between collimators 107(0,1)–107(0,N) and switch matrix 131. Switch matrix 131 includes M×N switch mirrors arranged in M columns and N rows within switch matrix 131.

For purposes of consistency, a switch mirror is referred to herein as (Mc,Mr), wherein Mc refers to the column where the mirror is located (beginning with the rightmost column with increasing column numbers to the left) and Mr refers to the row in which the switch mirror 120 is located (beginning with the row at the bottom of the switch matrix with increasing column numbers toward the top of switch matrix 131). Thus, for example, switch mirror (1,1) is located in the bottom right of switch matrix 131 and switch mirror (M,N) is located in the top left of switch matrix 131.

Switch mirrors 120 are coupled to substrate 105 in a pivoting configuration described in more detail below. According to one embodiment, each mirror 120 in matrix 131 is associated with a transmission path between a single input 180 and single output 170. Thus, for example mirror 120(1,2) is associated with a transmission path from input 180(1) to output 170(2). The collimated light is switched to the desired output port 180 by rotating a selected mirror with microactuators as described in more detail below.

FIG. 1 also shows switch controller 190 coupled to switch matrix 131, which controls the switching of switch mirrors 120 in switch matrix 131. In particular, according to one embodiment, switch controller 190 is a processor, which executes a process to perform switching decisions for mirrors in switch matrix 131. Switch controller 190 runs a process to detect mirror failures in switch matrix 131 and perform protection operations (described in more detail below). According to one embodiment of the present invention, switch controller 190 is coupled to actuators (described in detail below) at each switch mirror 120. Switch controller 190 may cause a mirror 120 to actuate by transmitting a signal to the actuator, which causes the respective mirror to actuate.

Figure 2:
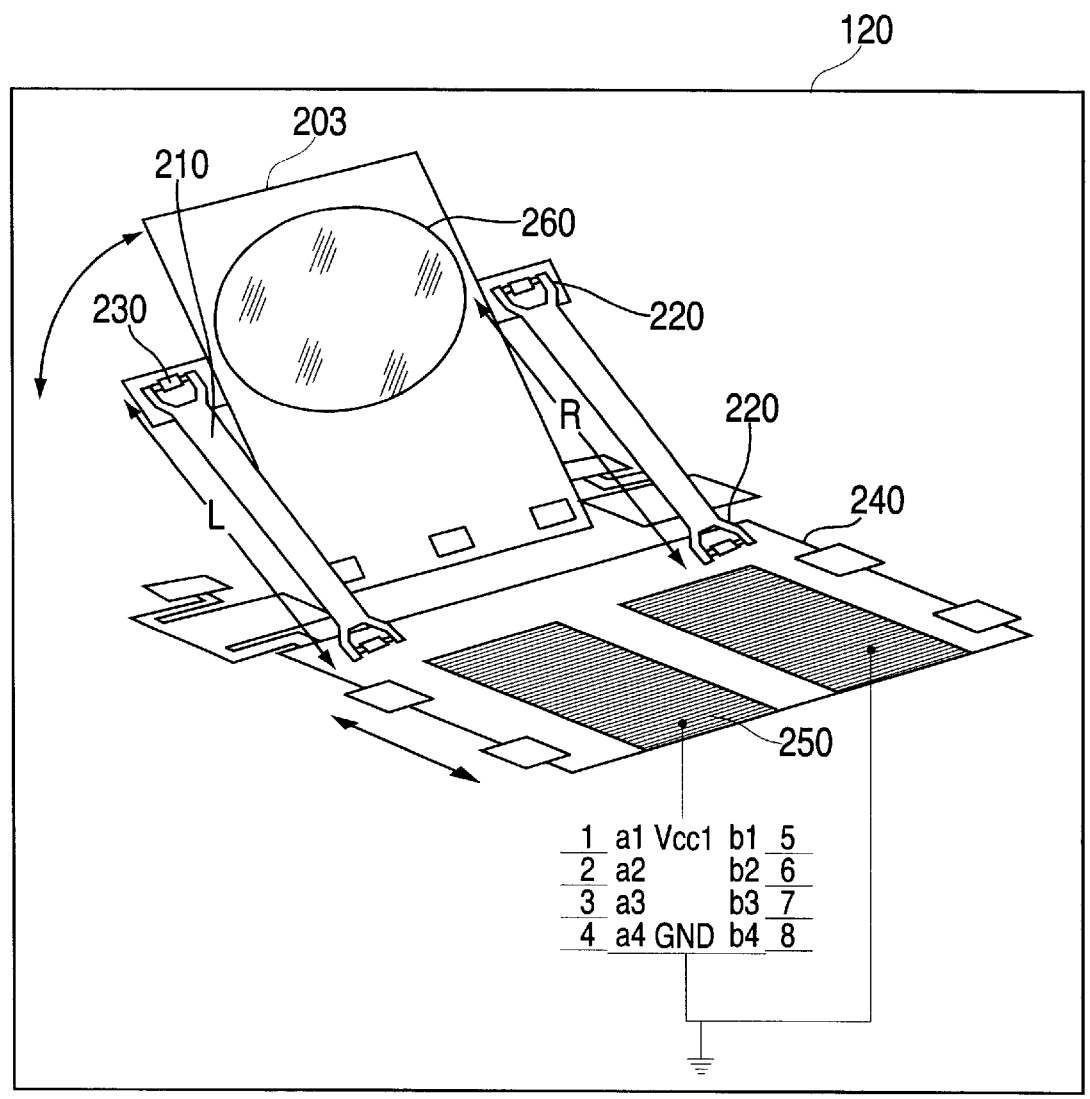
FIG. 2 depicts a switch mirror according to one embodiment of the present invention.

FIG. 2 depicts a switch mirror according to one embodiment of the present invention. FIG. 2 shows reflecting mirror 203, which includes reflecting surface 260. Although not depicted in FIG. 2, each reflecting mirror 203 is reflective on both sides. Reflecting mirror 203 is coupled to translation plate 240 via pushrod 210 and hinge joint 220. Switch mirror 120 also includes spring 230. Translation plate 240 includes scratch drive actuator 250. Reflecting mirror 203 is pivoted on substrate 105 via hinge joint 220. Pushrod 210 couples switch mirror 203 with translation plate 240 through hinge joints 220 and converts plate translation into mirror rotation efficiently. Translation plate 240 is integrated with high-precision scratch drive actuators 250.

Scratch drive actuators 250 are controlled by mirror actuation control unit 214, based upon switching decisions determined by switch controller 190. In particular, upon receiving a signal from switch control processor 190, mirror actuation control unit 214 applies a bias voltage via scratch drive actuators 250, which causes that particular mirror 120 to actuate. Conversely, to de-actuate a mirror 120, mirror actuation control unit 260 couples scratch drive actuators 250 to ground. Translation plate 240 translation distance and therefore switch mirror 203 rotation angle is determined by the number of bias pulses applied to scratch drive actuator 250.

Figure 3:
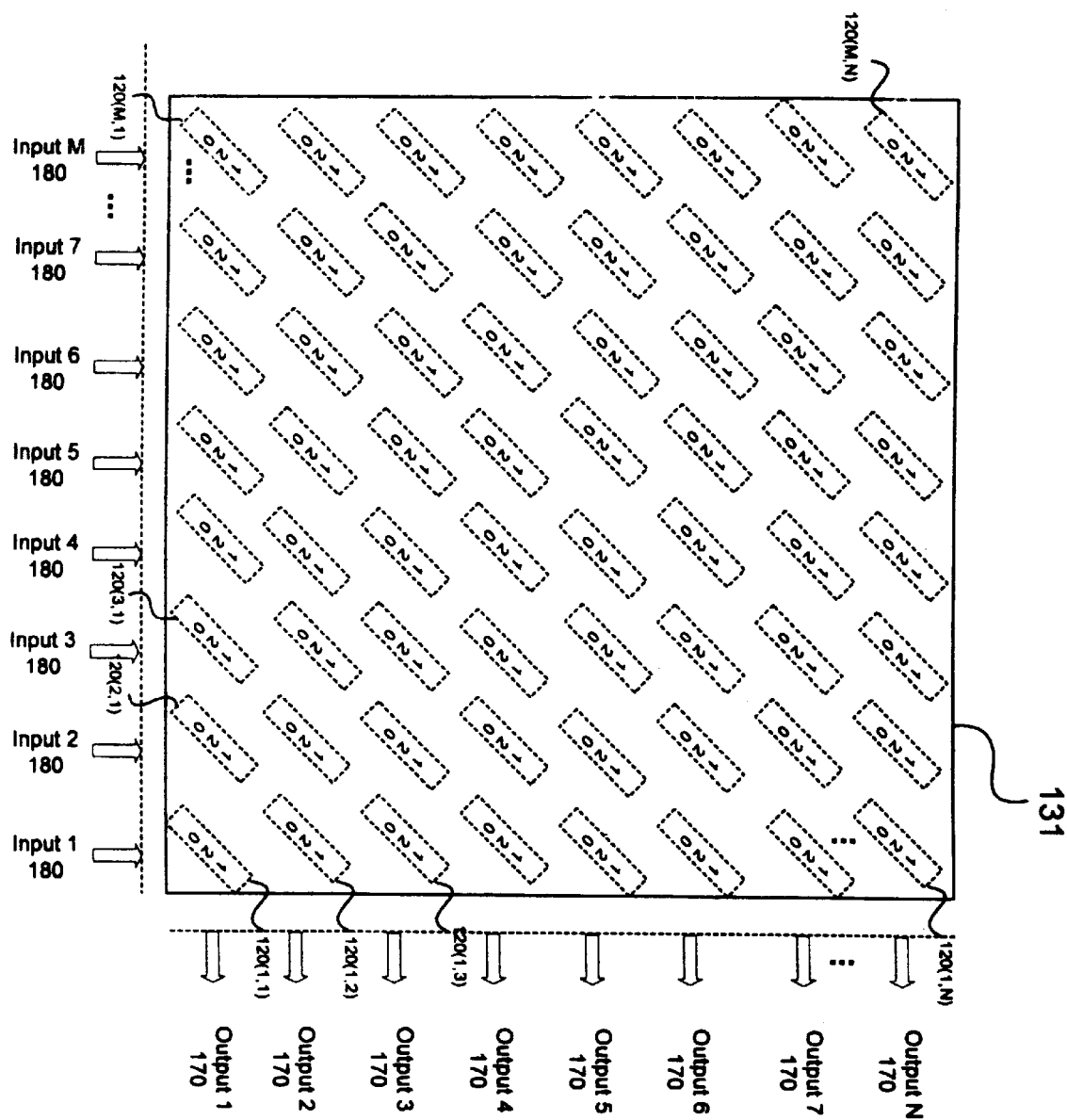
FIG. 3 depicts a block diagram of a mirror switching matrix according to one embodiment of the present invention.

FIG. 3 depicts a block diagram of a mirror switching matrix according to one embodiment of the present invention. Switch matrix 131 is coupled to M inputs and N outputs (via collimators 107 and lenses 109 not shown in FIG. 3). Furthermore, switch matrix 131 includes M×N microactuated switch mirrors 120 arranged respectively in M parallel columns and N parallel rows in switching matrix 131. Thus, for example, mirror (3,5) is located in column 3 and row 5. Note that columns are numbered from right to left and rows are numbered from bottom to top. These numbering conventions are merely illustrative and are not intended to limit the scope of the claims appended hereto. Each mirror located in column Mc and row Mr is associated with a transmission path between input Mc and output Mr. Thus, for example, if mirror (3,5) were actuated, it would establish a transmission path between input 3 180 and output 5 180. Note that FIG. 3 does not depict the actuation status of any mirrors (1,1)–(M,N). The actuation of a mirror within switching matrix 305 is accomplished as described above with respect to FIG. 2.

During the lifetime of an optical switch, certain switching elements 120 may fail. According to a first embodiment of the present invention, rather than requiring replacement of an entire switch 101 in the event of a mirror failure, an alternate protection path is determined to connect the desired input to the desired output using the backside of a reflecting mirror 203 of an already actuated mirror 120. In particular, upon the detection of a mirror failure that is associated with a transmission path between input M and output N, switch controller 190 determines a protection path connecting the input and output associated with the failed mirror 120 that utilizes the backside of a reflecting mirror 203 of an already actuated mirror 120 (referred to herein as a pivot mirror 120) in switching matrix 131. Then, switch controller 190 actuates additional mirrors 120 to establish the transmission path from the desired input 180 to the backside of the pivot mirror 120 to the output 170.

Figure 4:
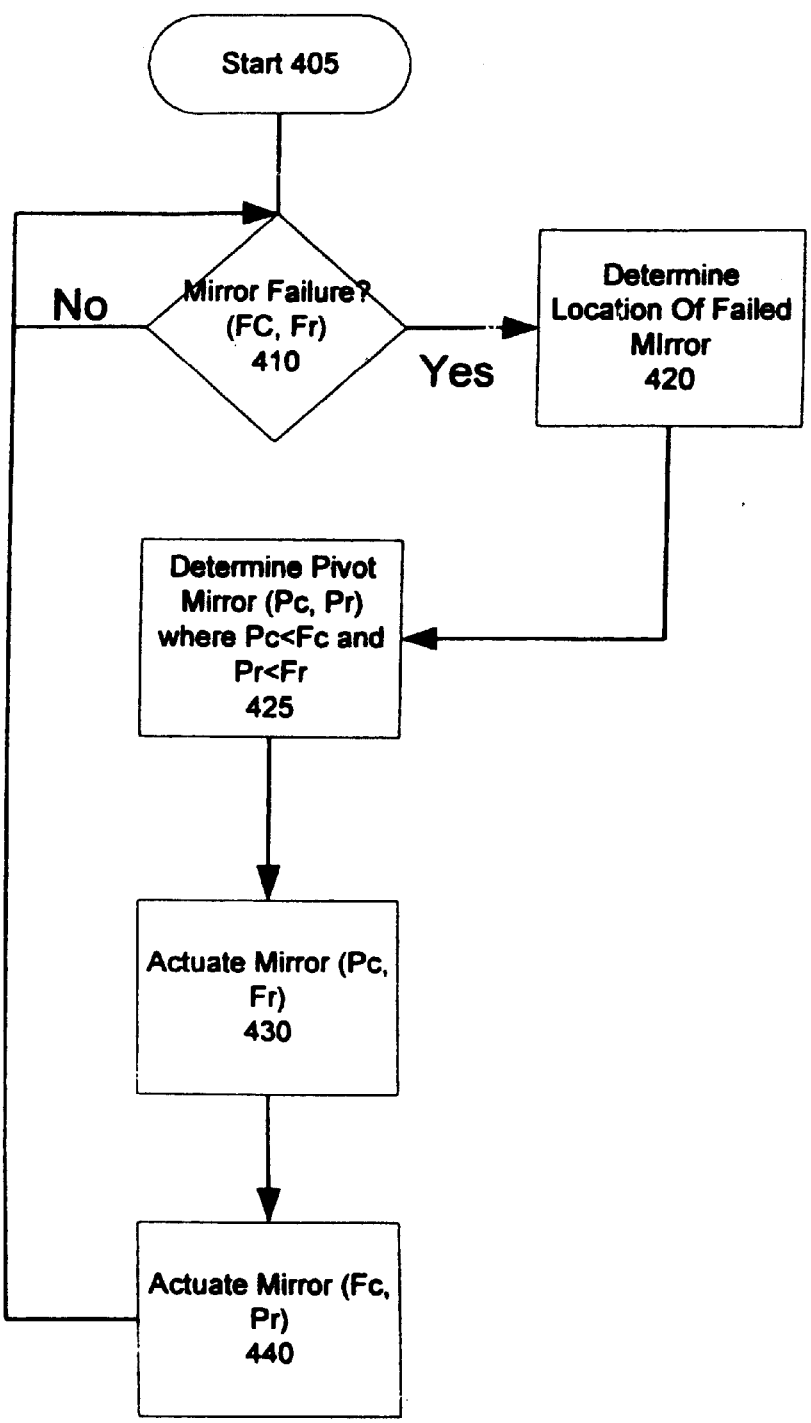
FIG. 4 is a flowchart for a protection operation according to one embodiment of the present invention.

FIG. 4 is a flowchart for a protection operation according to one embodiment of the present invention. In step 405, the process is initiated. In step 410, it is determined whether a mirror failure has occurred in switching matrix 131. If not ('no' branch of step 410), mirror failure is checked again (step 410). If a mirror failure is detected ('yes' branch of step 410), in step 420, the location of the failed mirror are determined (Fc,Fr). Then in step 425 a pivot mirror is determined where the pivot mirror is a actuated mirror at location (Pc,Pr) where Pc<Fc and Pr<Fr. In steps 430 and 440 mirrors 120 at locations (Fc,Pr) and (Pc,Fr) are actuated (turned on).

Figure 5:
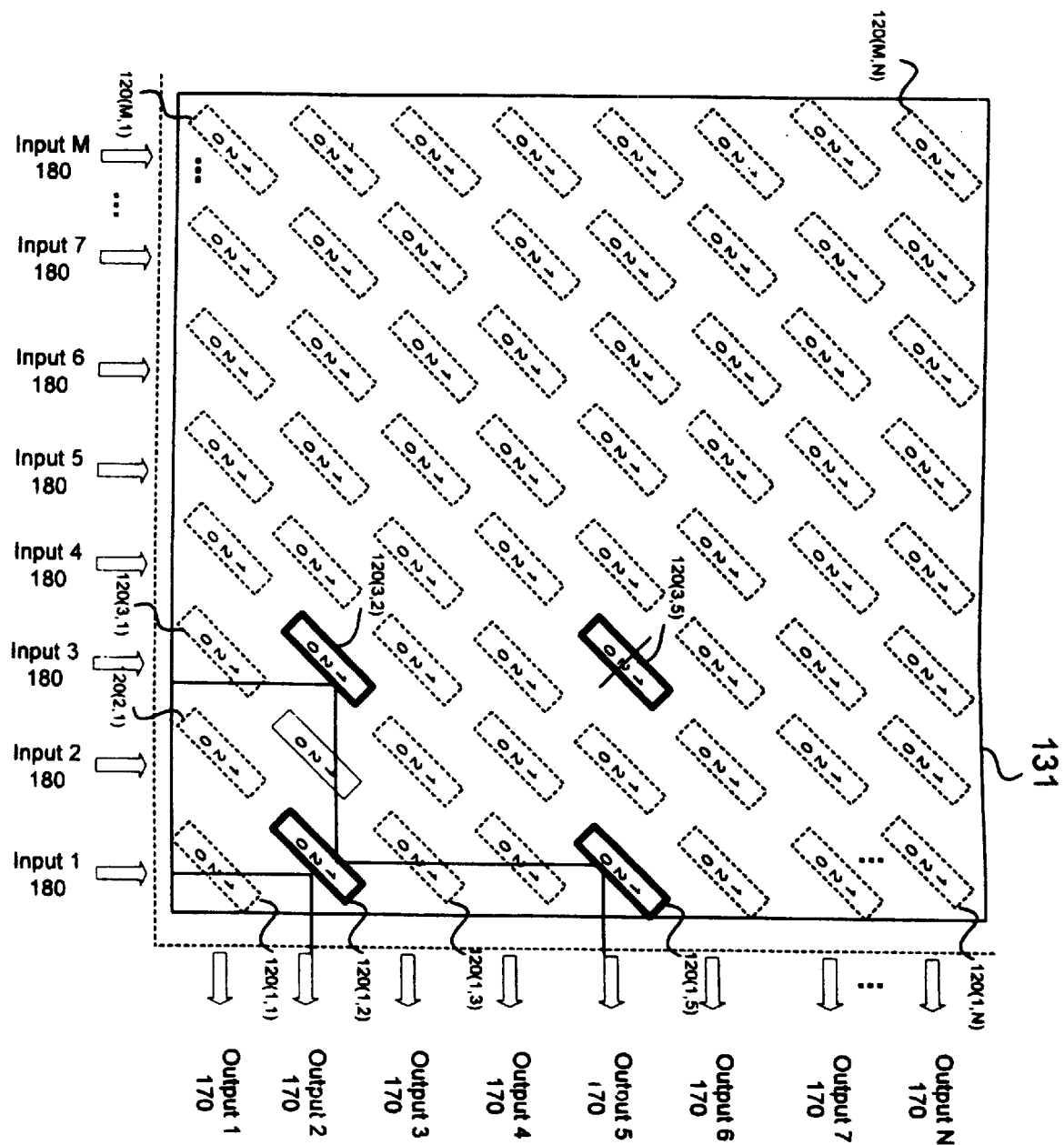
FIG. 5 depicts an exemplary protection operation in a micromachined mirror switching matrix according to one embodiment of the present invention.

FIG. 5 depicts an exemplary protection operation in a micromachined mirror switching matrix according to one embodiment of the present invention. FIG. 5 utilizes the definition of mirror (M,N) as the mirror at the intersection of input M and output N. FIG. 5 depicts an example of a failure of mirror (3,5) 120. It is assumed that prior to the failure of mirror (3,5), this mirror was actuated to connect signals from input 3 to output 5. It is further assumed that mirror (1,2) 120 was also actuated prior to failure of mirror (3,5) 120 to provide a transmission path from input 1 to output 2. Upon the detection of the failure of mirror (3,5) 120 a transmission path is determined from input 3 using the backside of already actuated mirror (1,2) 120 (pivot mirror) to mirror (1,5) 120. Then, mirrors (3,2) and (1,5) are actuated to establish the transmission path.

The approach depicted in FIGS. 3–4 has the limitation in the case in which mirror (Fc,Fr) 120 fails and all inputs 180 I where I<Fc are connected to output J 170, where J>Fr. In this case, utilizing the backside of any switch mirror (Pc,Pr) 120, where Pc<Fc and Pr<Fr will cause blocking of the optical path from input Pc 180.

Figure 6:
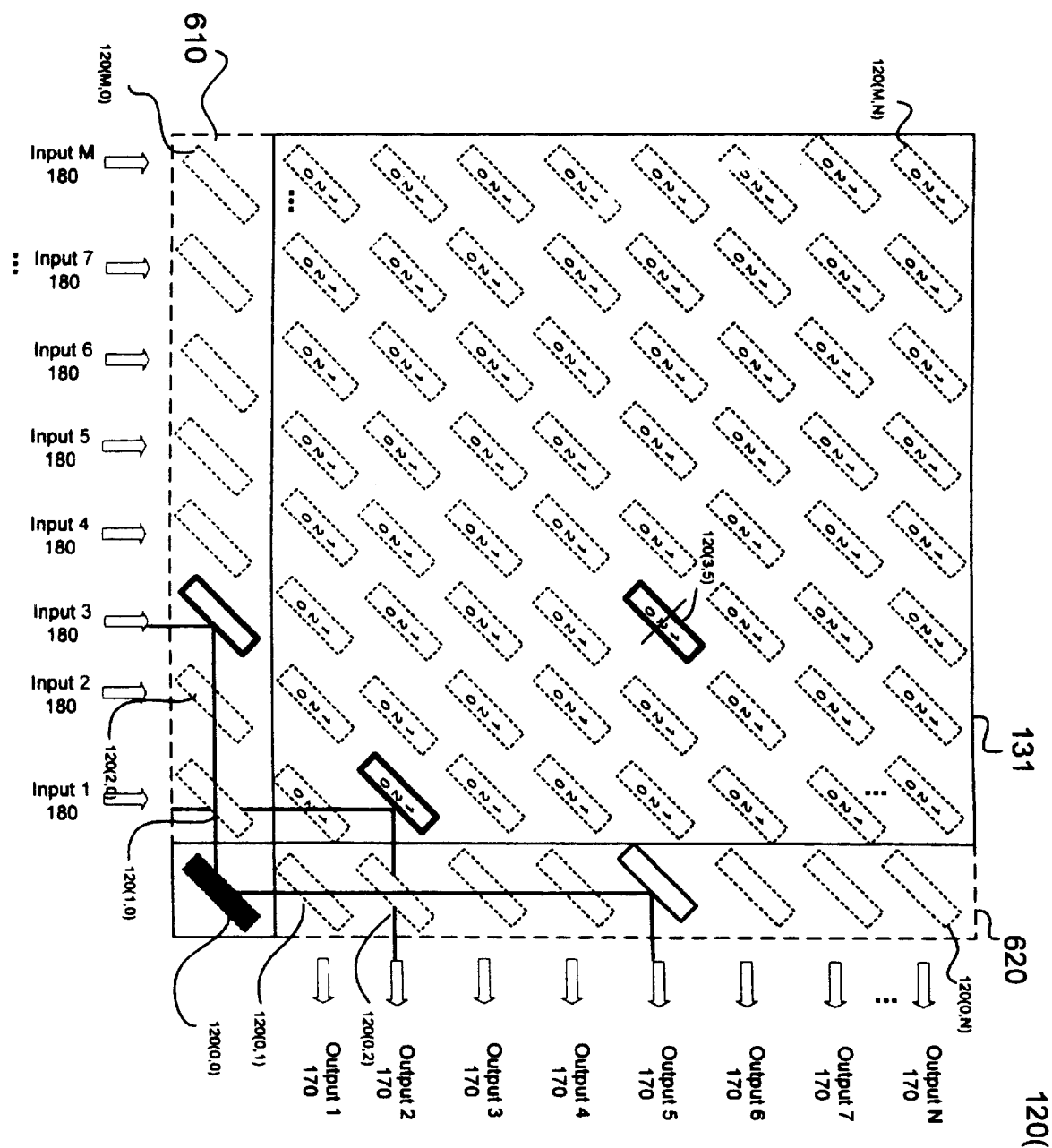
FIG. 6 also depicts an exemplary protection operation utilizing a protection row and protection column according to one embodiment of the present invention.

According to an alternative embodiment, which overcomes the above limitation, at least one additional row of mirrors 120 and at least one additional column of switch mirrors are integrated into the switch fabric 131. FIG. 6 depicts the integration of a protection row and a protection column into a switch fabric according to one embodiment of the present invention. In particular, FIG. 6 shows protection row 610 and protection column 620 integrated with switch fabric 131. Protection row 610 includes mirrors 120(0,0)–120(M,0). Protection column 620 includes mirrors 120(0, 0)–120(0,N). In particular, protection row 610 is integrated between inputs 180 and bottom row of switch fabric 131. Protection column 620, on the other hand, is integrated between the rightmost column of switch fabric 131 and outputs 170. Note also that protection row 610 and protection column 620 share a single mirror 120(0,0). This mirror 120(0,0) is permanently actuated and forms a potential path between any mirror in protection row 610 and protection column 620.

FIG. 6 also depicts an exemplary protection operation utilizing the protection row 610 and protection column 620. In particular, it is assumed that mirror 120(3,5) fails. It is further assumed that mirror 120(1,2) is actuated to connect input 1 180 with output 2 170. In this case mirror 120(3,0) in protection row 610 and mirror (0,5) in protection column are actuated to connect input 3 180 with output 5 170. In general, upon the failure of a mirror 120(Fc,Fr), mirror (Fc,0) in protection row 610 and mirror (0,Fr) in protection column 620 are actuated.

What is claimed is:

1. A method for performing protection in a free-space micro-machined optical switching fabric, wherein the switching fabric receives a plurality of inputs (M), and provides a plurality of outputs (N), comprising a matrix of micromachined free-rotating mirrors arranged in a plurality of (N) parallel rows and (M) columns wherein each of the plurality of mirrors is in either one of an actuated or non-actuated state comprising the steps of:

detecting a failed mirror, wherein the failed mirror is associated with a transmission path between an input and an output;

determining a transmission path between the input and the output, wherein the transmission path includes a backside of a pivot mirror that is in an actuated state;

actuating at least one mirror, to establish the transmission path between the input and the output that includes the backside of the pivot mirror.

2. The method according to claim 1, wherein the step of actuating at least one mirror further includes the steps of:

actuating a first mirror in a same row as the pivot mirror and a same column as the failed mirror;

actuating a second mirror in a same column as the pivot mirror and a same row as the failed mirror.

3. The method according to claim 1, wherein the mirrors include a first and a second side, wherein the first and second side include a reflective material.

4. A method for performing protection in a free-space micro-machined optical switching fabric, wherein the switching fabric receives a plurality of inputs (M), and provides a plurality of outputs (N), comprising a matrix of micromachined free-rotating mirrors arranged in a plurality of (N) parallel rows and (M) columns wherein each of the plurality of mirrors is in either one of an actuated or non-actuated state columns comprising the steps of:

detecting a failed mirror, wherein the failed mirror is located in a row Fr and a column Fc of the matrix;

determining a pivot mirror, in a row (Pr) and a column (Pc), wherein the pivot mirror is in an actuated state and Pr<Fr and Pc<Fc;

actuating a first mirror, wherein the first mirror is located in a row Pr and a column Fc;

actuating a second mirror, wherein the second mirror is located in a row Fr and a column Pc.

5. The method according to claim 4, wherein the mirrors include a first and a second side, wherein the first and second side include a reflective material.

6. A method for performing protection in a free-space micro-machined optical switching fabric, wherein the switching fabric receives a plurality of inputs (M), and provides a plurality of outputs (N), comprising a matrix of micromachined free-rotating mirrors, arranged in a plurality of N parallel rows and M parallel columns wherein each of the plurality of mirrors is in either one of an actuated or a non-actuated state comprising the steps of:

providing at least one protection row, wherein the protection row includes a plurality of mirrors;

providing at least one protection column, wherein the protection column includes a plurality of mirrors;

determining a failed mirror, wherein the failed mirror is associated with an input and an output;

determining a transmission path between the input and the output associated with the failed mirror that includes a first mirror located in the protection row and a second mirror in the protection column;

actuating at least one mirror, to establish the transmission path between the first mirror and the second mirror.

7. The method according to claim 6, wherein the transmission path includes a pivot mirror co-located in the protection row and the protection column.

8. A method for performing protection in a free-space micro-machined optical switching fabric, wherein the switching fabric receives a plurality of inputs (M), and provides a plurality of outputs (N), comprising a matrix of micromachined free-rotating mirrors, arranged in a plurality of N parallel rows and M parallel columns wherein each of the plurality of mirrors is in either one of an actuated or a non-actuated state comprising the steps of:

providing at least one protection row, wherein the protection row includes a plurality of mirrors;

providing at least one protection column, wherein the protection column includes a plurality of mirrors and wherein the protection column includes a pivot mirror co-located in the protection row;

actuating the pivot mirror, wherein the pivot mirror provides a transmission path between at least one of the mirrors in the protection row and at least one of the mirrors in the protection column, wherein the transmission path includes a backside of the pivot mirror;

determining a failed mirror, wherein the failed mirror is associated with an input and an output;

determining a transmission path between the input and the output associated with the failed mirror that includes a first mirror located in the protection row, a backside of the pivot mirror and a second mirror in the protection column; and actuating the first mirror in the protection row and the second mirror in the protection column.

9. An optical cross-connect switch with protection comprising:

at least one input;

at least one output;

a switching fabric, including a plurality of micromachined mirrors arranged in a rectilinear configuration of rows and columns, wherein each of the mirrors establishes a transmission path between a single input and a single output, and wherein each micromachined mirrors includes actuation means for selectively placing the mirror in one of an actuated or non-actuated state, wherein the actuation means receives a signal for placing an associated mirror in one of an actuated and a non-actuated state;

a control processor, coupled to the actuation means of each of the mirrors, wherein the control processor transmits a signal to each of the actuation means associated with each of the plurality of mirrors for placing the associated mirror in one of an actuated or non-actuated state, and wherein the processor is adapted to:

detect a failed mirror, wherein the failed mirror is associated with a transmission path between an input and an output;

determine a transmission path between the input and the output, wherein the transmission path includes a backside of a pivot mirror that is in an actuated state;

transmit a signal to at least one actuation means to establish the transmission path between the input and the output that includes the backside of the pivot mirror.

10. An optical cross-connect switch with protection comprising:

at least one input;

at least one output;

a switching fabric, including a plurality of micromachined mirrors arranged in a rectilinear configuration of rows and columns, wherein each of the mirrors establishes a transmission path between a single input and a single output, and wherein each micromachined mirrors includes actuation means for selectively placing the mirror in one of an actuated or non-actuated state, wherein the actuation means receives a signal for placing an associated mirror in one of an actuated and a non-actuated state;

at least one protection row, wherein the protection row includes a plurality of micromachined mirrors;

at least one protection column, wherein the protection column includes a plurality of micromachined mirrors;

a control processor, coupled to the actuation means of each of the mirrors, wherein the control processor transmits a signal to each of the actuation means associated with each of the plurality of mirrors for placing the associated mirror in one of an actuated or non-actuated state, and wherein the processor is adapted to:

detect a failed mirror, wherein the failed mirror is associated with a transmission path between an input and an output;

determine a transmission path between the input and the output associated with the failed mirror that includes a first mirror located in the protection row, a backside of a pivot mirror and a second mirror in the protection column wherein the transmission path includes a backside of a pivot mirror that is in an actuated state;

actuating the first mirror in the protection row and the second mirror in the protection column.

* * * * *